US010512074B2

(12) United States Patent
Cariou et al.

(10) Patent No.: US 10,512,074 B2
(45) Date of Patent: Dec. 17, 2019

(54) UPLINK (UL) MULTI-USER (MU) FEEDBACK USING HIGH-EFFICIENCY (HE) LONG TRAINING FIELDS IN A WIRELESS LOCAL-AREA NETWORK

(71) Applicant: Intel IP Corporation, Santa Clara, CA (US)

(72) Inventors: Laurent Cariou, Portland, OR (US); Po-Kai Huang, West Lafayette, IN (US); Yaron Alpert, Hod Hasharoni (IL); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 826 days.

(21) Appl. No.: 15/080,638

(22) Filed: Mar. 25, 2016

(65) Prior Publication Data

US 2017/0064684 A1    Mar. 2, 2017

Related U.S. Application Data

(60) Provisional application No. 62/212,018, filed on Aug. 31, 2015.

(51) Int. Cl.
*H04W 72/04*    (2009.01)
*H04B 7/0452*    (2017.01)
(Continued)

(52) U.S. Cl.
CPC ........ *H04W 72/044* (2013.01); *H04B 7/0452* (2013.01); *H04L 5/0025* (2013.01);
(Continued)

(58) Field of Classification Search
CPC ........... H04W 72/044; H04W 72/0406; H04W 74/002; H04W 84/12; H04L 5/0091; H04L 5/0037; H04L 5/0025; H04B 7/0452

See application file for complete search history.

(56) References Cited

U.S. PATENT DOCUMENTS 9,706,553 B2 *   7/2017   Knapp ................ H04L 27/0006
2011/0170515 A1 *   7/2011   Kim .................... H04W 72/042
                                                                                                                           370/330

(Continued)

FOREIGN PATENT DOCUMENTS

WO    WO-2015076532 A1    5/2015
WO    WO-2017040032 A1    3/2017

OTHER PUBLICATIONS

"International Application Serial No. PCT/US2016/047195, International Search Report dated Nov. 7, 2016", 5 pgs.

(Continued)

*Primary Examiner* — Jay P Patel
(74) *Attorney, Agent, or Firm* — Schwegman Lundberg & Woessner, P.A.

(57) ABSTRACT

Apparatus, computer readable media, and methods for UL MU feedback using HE-LTFs in a wireless local-area network are disclosed. An apparatus of a station comprising memory and processing circuitry couple to the memory is disclosed. The processing circuitry may be configured to: decode a frame comprising one or more resource block identification (RBIDs), wherein each RBID indicates a resource allocation to transmit one bit of information to a access point. Additionally, the processing circuitry may be configured to encode a response to the availability trigger frame in accordance with the resource allocation indicated by the one or more RBIDs, in response to decoding an availability trigger frame from the access point. The pro- (Continued)

cessing circuitry may be configured to configure the station to transmit the response to the access point in accordance with orthogonal frequency division multiple access (OFDMA).

24 Claims, 12 Drawing Sheets

(51) Int. Cl.
*H04L 5/00* (2006.01)
*H04W 84/12* (2009.01)
*H04W 74/00* (2009.01)

(52) U.S. Cl.
CPC .......... *H04L 5/0037* (2013.01); *H04L 5/0091* (2013.01); *H04W 72/0406* (2013.01); *H04W 74/002* (2013.01); *H04W 84/12* (2013.01)

(56) References Cited

U.S. PATENT DOCUMENTS

| | | | | |
|---|---|---|---|---|
| 2015/0016325 A1* | 1/2015 | Yang | ................ | H04W 52/0216 |
| | | | | 370/311 |
| 2015/0023335 A1* | 1/2015 | Vermani | .............. | H04B 7/0452 |
| | | | | 370/338 |
| 2015/0085777 A1 | 3/2015 | Seok | | |
| 2016/0006554 A1* | 1/2016 | Wang | ................... | H04L 5/0073 |
| | | | | 370/329 |
| 2016/0127233 A1* | 5/2016 | Wentink | ............ | H04W 72/1289 |
| | | | | 370/392 |
| 2016/0143026 A1* | 5/2016 | Seok | ................. | H04W 72/0413 |
| | | | | 370/329 |
| 2016/0315675 A1* | 10/2016 | Seok | .................... | H04B 7/0452 |
| 2016/0323426 A1* | 11/2016 | Hedayat | ............ | H04W 28/0268 |
| 2016/0360507 A1* | 12/2016 | Cariou | .................. | H04W 72/04 |
| 2016/0366254 A1* | 12/2016 | Asterjadhi | ............ | H04L 69/324 |
| 2017/0019863 A1* | 1/2017 | Cariou | ................ | H04W 52/283 |
| 2017/0048048 A1* | 2/2017 | Seok | ..................... | H04L 5/0055 |
| 2017/0223665 A1* | 8/2017 | Chun | ...................... | H04L 27/26 |
| 2017/0230981 A1* | 8/2017 | Ryu | ....................... | H04W 74/00 |
| 2017/0279864 A1* | 9/2017 | Chun | ........................ | H04L 1/00 |
| 2017/0303280 A1* | 10/2017 | Chun | ...................... | H04L 27/26 |
| 2017/0339692 A1* | 11/2017 | Chun | .................... | H04L 1/0003 |
| 2018/0007661 A1* | 1/2018 | Chun | .................... | H04L 1/1861 |
| 2018/0288743 A1* | 10/2018 | Choi | .................... | H04W 76/10 |
| 2018/0310330 A1* | 10/2018 | Chun | .................... | H04L 5/0053 |

OTHER PUBLICATIONS

"International Application Serial No. PCT/US2016/047195, Written Opinion dated Nov. 7, 2016", 7 pgs.

Chittabrata, Ghosh, et al., "Random Access with Trigger Frames using OFDMA", IEEE 802.11-15/0875r1, (Jul. 14, 2015), 16 pgs.

Simone, Merlin, et al., "Trigger Frame Format", IEEE 802.11-15/0877r1, (Jul. 15, 2015), 15 pgs.

Yonggang, Fang, et al., "UL MU Random Access Analysis", IEEE 802.11-15/0843r1, (Jul. 15, 2015), 20 pgs.

"International Application Serial No. PCT/US2016/047195, International Preliminary Report on Patentability dated Mar. 15, 2018", 7 pgs.

* cited by examiner

BSS

| RU | SS | RBID | | 210.1 | 210.2 | 210.3 | 210.4 | |
|---|---|---|---|---|---|---|---|---|
| | SS4 | RBID1 | 212.1 | HE-LTF | -HE-LTF | HE-LTF | HE-LTF | 208.1 |
| | SS3 | RBID2 | 212.2 | HE-LTF | HE-LTF | -HE-LTF | HE-LTF | 208.2 |
| | SS2 | RBID3 | 212.3 | HE-LTF | HE-LTF | HE-LTF | -HE-LTF | 208.3 |
| RU1 | SS1 | RBID4 | 212.4 | -HE-LTF | HE-LTF | HE-LTF | HE-LTF | 208.4 |
| | SS4 | RBID5 | | HE-LTF | -HE-LTF | HE-LTF | HE-LTF | |
| | SS3 | RBID6 | | HE-LTF | HE-LTF | -HE-LTF | HE-LTF | |
| | SS2 | RBID7 | | HE-LTF | HE-LTF | HE-LTF | -HE-LTF | |
| RU2 | SS1 | RBID8 | | -HE-LTF | HE-LTF | HE-LTF | HE-LTF | |
| | SS4 | RBID9 | 212.4 | HE-LTF | -HE-LTF | HE-LTF | HE-LTF | |
| | SS3 | RBID10 | | HE-LTF | HE-LTF | -HE-LTF | HE-LTF | |
| | SS2 | RBID11 | | HE-LTF | HE-LTF | HE-LTF | -HE-LTF | |
| RU3 | SS1 | RBID12 | | -HE-LTF | HE-LTF | HE-LTF | HE-LTF | |
| | SS4 | RBID13 | | HE-LTF | -HE-LTF | HE-LTF | HE-LTF | |
| | SS3 | RBID14 | | HE-LTF | HE-LTF | -HE-LTF | HE-LTF | |
| | SS2 | RBID15 | | HE-LTF | HE-LTF | HE-LTF | -HE-LTF | |
| RU4 | SS1 | RBID16 | | -HE-LTF | HE-LTF | HE-LTF | HE-LTF | |
| | SS4 | RBID17 | | HE-LTF | -HE-LTF | HE-LTF | HE-LTF | |
| | SS3 | RBID18 | | HE-LTF | HE-LTF | -HE-LTF | HE-LTF | |
| | SS2 | RBID19 | | HE-LTF | HE-LTF | HE-LTF | -HE-LTF | |
| RU5 | SS1 | RBID20 | | -HE-LTF | HE-LTF | HE-LTF | HE-LTF | |
| | SS4 | RBID21 | | HE-LTF | -HE-LTF | HE-LTF | HE-LTF | |
| | SS3 | RBID22 | | HE-LTF | HE-LTF | -HE-LTF | HE-LTF | |
| | SS2 | RBID23 | | HE-LTF | HE-LTF | HE-LTF | -HE-LTF | |
| RU6 | SS1 | RBID24 | 212.24 | -HE-LTF | HE-LTF | HE-LTF | HE-LTF | |
| | SS4 | RBID25 | | HE-LTF | -HE-LTF | HE-LTF | HE-LTF | |
| | SS3 | RBID26 | | HE-LTF | HE-LTF | -HE-LTF | HE-LTF | |
| | SS2 | RBID27 | | HE-LTF | HE-LTF | HE-LTF | -HE-LTF | |
| RU7 | SS1 | RBID28 | | -HE-LTF | HE-LTF | HE-LTF | HE-LTF | |
| | SS4 | RBID29 | | HE-LTF | -HE-LTF | HE-LTF | HE-LTF | |
| | SS3 | RBID30 | | HE-LTF | HE-LTF | -HE-LTF | HE-LTF | |
| | SS2 | RBID31 | | HE-LTF | HE-LTF | HE-LTF | -HE-LTF | |
| RU8 | SS1 | RBID32 | | -HE-LTF | HE-LTF | HE-LTF | HE-LTF | |
| | SS4 | RBID33 | | HE-LTF | -HE-LTF | HE-LTF | HE-LTF | |
| | SS3 | RBID34 | | HE-LTF | HE-LTF | -HE-LTF | HE-LTF | |
| | SS2 | RBID35 | | HE-LTF | HE-LTF | HE-LTF | -HE-LTF | |
| RU9 | SS1 | RBID36 | 212.36 | -HE-LTF | HE-LTF | HE-LTF | HE-LTF | 208.36 |

UPLINK (UL) MULTI-USER (MU) FEEDBACK USING HIGH-EFFICIENCY (HE) LONG TRAINING FIELDS IN A WIRELESS LOCAL-AREA NETWORK

PRIORITY CLAIM

This application claims the benefit of priority under 35 USC 119(e) to U.S. Provisional Patent Application Ser. No. 62/212,018, filed Aug. 31, 2015, which is incorporated herein by reference in its entirety.

TECHNICAL FIELD

Embodiments relate to Institute of Electrical and Electronic Engineers (IEEE) 802.11. Some embodiments relate to high-efficiency (HE) wireless local-area networks. Some embodiments relate to IEEE 802.11ax. Some embodiments relate to methods and devices for querying and responding using short uplink (UL) multi-user (MU) feedback. Some embodiments relate to feedback from HE stations of a single bit using HE long training fields (HE-LTFs).

BACKGROUND

Efficient use of the resources of a wireless local-area network (WLAN) is important to provide bandwidth and acceptable response times to the users of the WLAN. One way to increase the efficiency of a WLAN is allocating a proper resource unit to a station. However, often allocating the proper resources to a station is difficult to determine. Moreover, wireless devices need to operate with both newer protocols and with legacy devices.

BRIEF DESCRIPTION OF THE DRAWINGS

The present disclosure is illustrated by way of example and not limitation in the figures of the accompanying drawings, in which like references indicate similar elements and in which:

FIG. 2 illustrates resource allocations with resource block identifications (RBIDs) assigned to each of the resource allocations in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
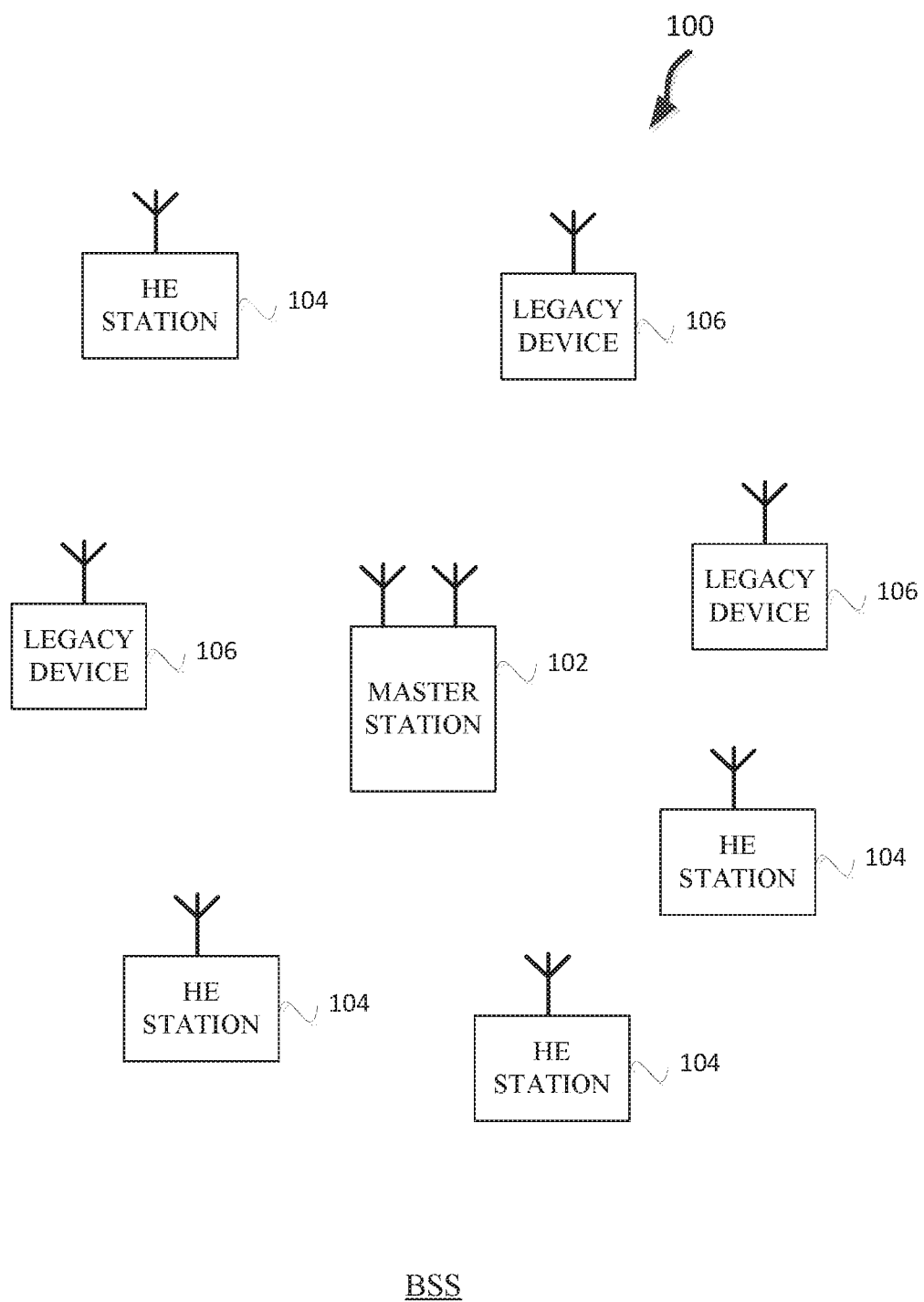
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency (HE) (e.g., IEEE 802.11ax) stations (STA)s 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HE STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HE frame may be configured for transmitting a number of spatial streams, which may be in accordance with MU-MIMO. In other embodiments, the master station 102, HE STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (Wi-MAX)), BlueTooth®, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating.

In accordance with some embodiments, during the master-sync transmission the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE control period in accordance with legacy IEEE 802.11 communication techniques, although this is not a requirement.

In example embodiments, the HE device 104 and/or the master station 102 are configured to perform the methods and functions herein described in conjunction with FIGS. 1-9.

FIG. 2 illustrates resource allocations with resource block identifications (RBIDs) assigned to each of the resource allocations in accordance with some embodiments. Illustrated in FIG. 2 is RBID table 251 and P matrix table 250. RBID table 251 includes columns resource unit (RU) 202, spatial stream (SS) 204, RBID 206, and RU rows 212. The RBID table 251 is divided into nine resource units (RU), RU1, RU2, RU3, RU4, RU5, RU6, RU7, RU8, and RU9. Each of the RUs are a subchannel of a channel in the frequency domain with a bandwidth. For example, each RU 202 may have a bandwidth of approximately 2 MHz (e.g., 2.03125) with exactly 26 or 52 data carriers as part of a 20 MHz channel. Each RU 202 may include a number of SSs 204. In this case, four SSs 204 are illustrated, SS1, SS2, SS3, and SS4. The RBIDs 206 are numbered sequentially based on the RUs 202 and the SSs 204. There are 36 RBIDs 206 in this illustration. The channel may be a channel that a HE long-training field (HE-LTF) is transmitted on. The RUs 202 may each be part of an HE-LTF.

The P matrix table 250 includes P-matrix rows 208 and P-matrix columns 210. The P matrix columns indicate the values of the P matrix for different SSs. Each P-matrix row 208 of the P matrix table 250 corresponds to a RU row 212. For example, RU row 212.1 corresponds to P-matrix row 208.1. In some embodiments, the RBID table 251 may be constructed with different RU bandwidths or a different number of SSs 204. For example, in some embodiments, the master station 102 will allocate RUs two or more 20 MHz channels, which may include the primary channel.

Figure 3:
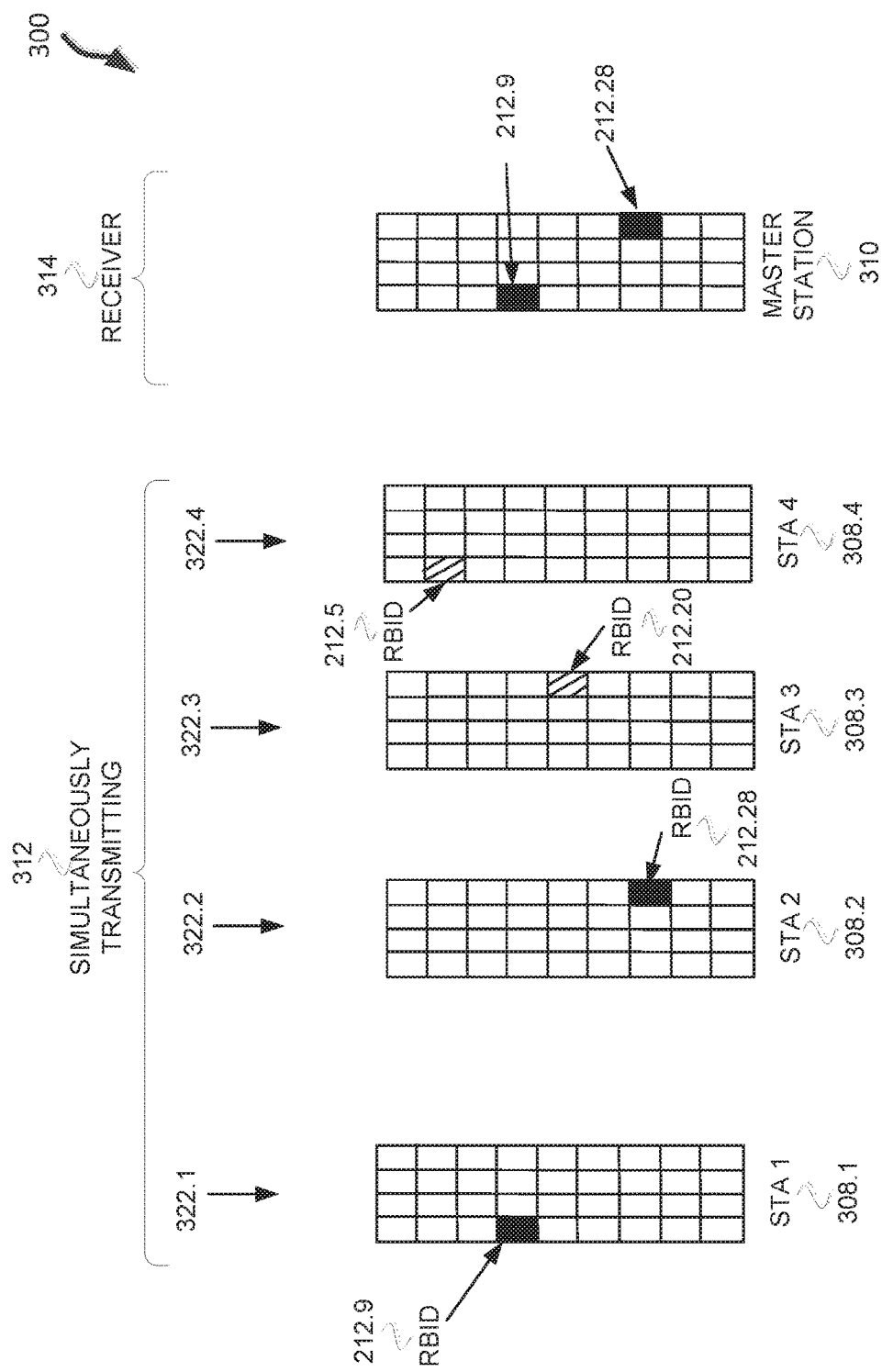
FIG. 3 illustrates an example of stations transmitting responses to a master station in accordance with some embodiments.

FIG. 3 illustrates an example 300 of stations transmitting responses 322 to a master station in accordance with some embodiments. Illustrated in FIG. 3 is STA 1 308.1, STA 2 308.2, STA 3 308.3, and STA 4 308.4 simultaneously transmitting 312 responses 322 to receiver 314. STA 1 608.1, STA 2 608.2, STA 3 308.3, and STA 4 308.4 may be HE stations 104. The master station 310 may be a master station 102 or a HE station 104. The responses 308 may be HE-LTFs.

STA 1 308.1 is transmitting a response 322.1 and STA 2 308.2 is transmitting a response 322.2. STA 3 308.3, and STA 4 308.4 are illustrated with responses 322.3 and 322.4, respectively, which may not be transmitted since no energy is actually being transmitted in the example illustrated. STA 3 308.3 may be allocated the resource allocation indicated by RBID 212.20. STA 4 308.4 may be allocated the resource allocation indicated by RBID 212.5. STA 3 308.3 is not transmitting energy on the resource allocation indicated by RBID 212.20. STA 4 308.4 is not transmitting energy on the resource allocation indicated by RBID 212.5.

STA 1 308.1 is transmitting on a resource allocation indicated by RBID 212.9 (see FIG. 2) and STA 2 308.2 is transmitting on a resource allocation indicated by RBID 212.24 (see FIG. 2). STA 1 308.1, STA 2 308.2, STA 3 308.3, and STA 4 308.4 may have been assigned their respective RBIDs 212 based on reception of a packet from a master station 102. In some embodiments, the STAs 308 may determine the RBIDs 212 based on a communication standard. In some embodiments, the STAs 308 may be assigned more than one RBID 212. In some embodiments, there may be a range of RBIDs 212 for the STAs 308 to select from. The STAs 308 may be associated with the master station 102. In some embodiments, STAs 308 may be associated with a neighbor access point of the master station 102 that responses 322 are being transmitted to.

As illustrated, the RBIDs 212 are being transmitted on a 20 MHz subchannel with four spatial streams. In some embodiments, multiple subchannels may be used or the subchannel may be smaller or larger. In some embodiments, the STAs 308 may transmit on more than one subchannel. In some embodiments, the STAs 308 may transmit on more than one subchannel where on each subchannel the same RBID 212 for the subchannel is used. STAs 308 may transmit using the RBIDs 212 in accordance with OFDMA and/or MU-MIMO.

The receiver 314, which, as illustrated, is a master station 102, receives the transmission on the resource indicated by RBID 212.9 from STA 1 308.1 and the resource indicated by RBID 212.24 from STA 2 308.2 at the same time. The STAs 308 may transmit simultaneously on the same subchannel. Each resource indicated by a RBID 212 may be a 1-bit response mechanism. In some embodiments, the RBIDs 212 indicate that the corresponding STA 308 would like UL resources to transmit packets to the master station 102. For example, the master station 102 may transmit a UL OFDMA resource poll. The STAs 308 may transmit the responses 322 encoded with the resource allocation indicated by RBIDs 212 to indicate they would like resources to transmit packets (e.g., association requests) to the master station 102.

Figure 4:
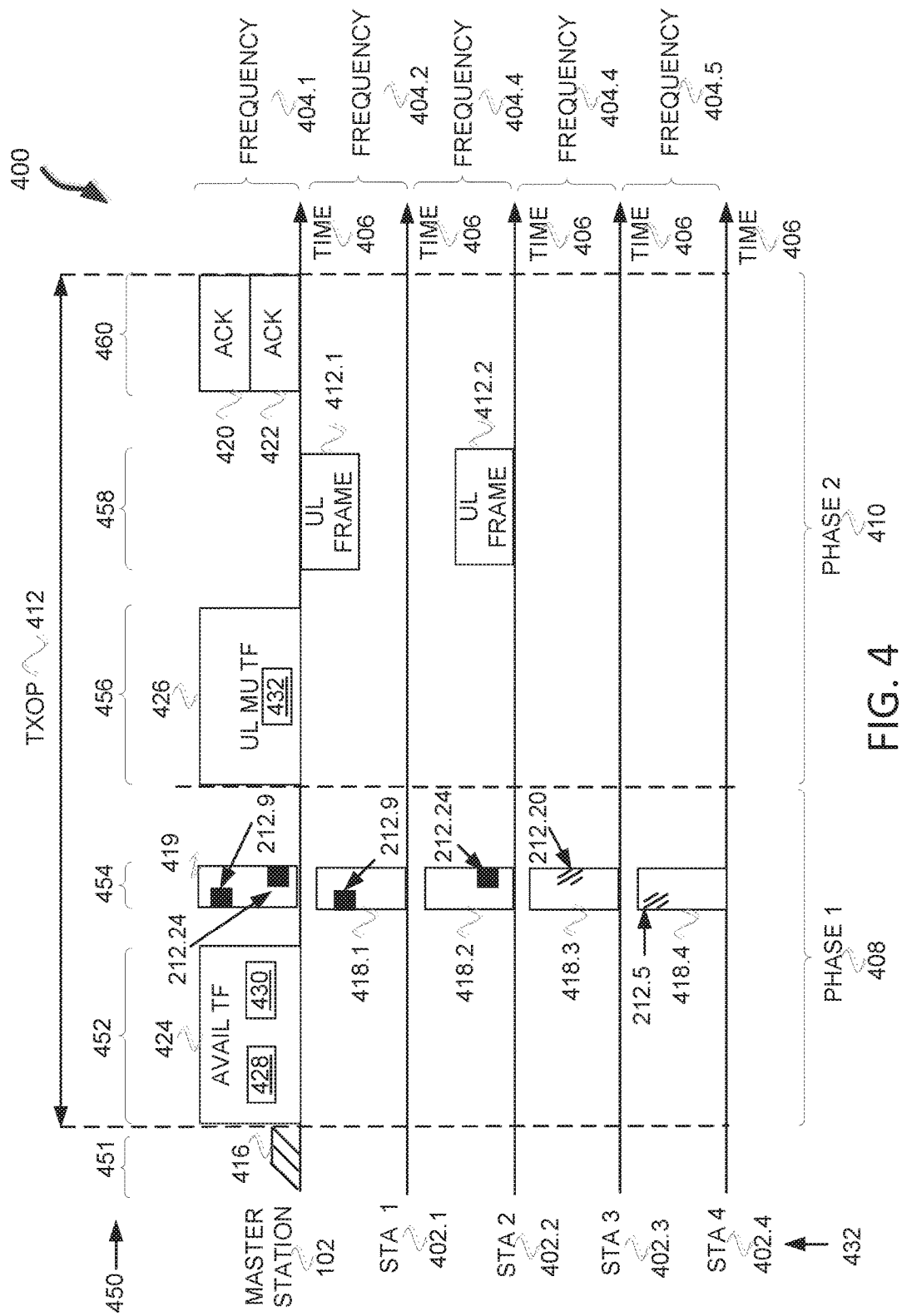
FIG. 4 illustrates a method of MU feedback using HE-LTF in accordance with some embodiments.

FIG. 4 illustrates a method 400 of MU feedback using HE-LTF in accordance with some embodiments. Illustrated in FIG. 4 is time 406 along a horizontal axis, transmitter or receiver 432 along a vertical axis, frequency 404 along the vertical axis, and a transmission opportunity (TXOP) 412. As illustrated, each of the frequencies 404.1, 404.2, 404.3, and 404.4 are the same 20 MHz channel, which may be a primary channel. The frequencies 404 may be different channels and different bandwidths. The TXOP 412 may include a phase 1 408 and a phase 2 410. Operations 450 are illustrated along the top. STAs 402 may be HE stations 104.

The method 400 begins at operation 451 with the master station 102 acquiring the wireless medium 416. The method 400 continues at operation 452 with the master station 102 transmitting an availability trigger frame (TF). The availability TF 424 may include a type 428 and an RBID mapping 430. The type 428 may indicate a type of query the availability TF 424. For example, as illustrated in FIG. 4, the type may be query as to whether the STAs 402 are available and/or want to receive an UL resource allocation from the master station 102. The type may be an indication that the STA 402 should transmit an indication on each channel whether the STA 402 is available on that station and/or whether the STA 402 wants to receive an UL resource allocation from the master station 102.

The STA 402 may determine their availability based on a clear channel assessment (CCA). The type 428 may be another type such as an indication that the STAs 402 should transmit on each RU 202 (see FIG. 2). The type 428 may be another type such as an indication that the STAs 402 should transmit on the resource allocation indicated by the RBID to indicate the STAs 402 a CCA of the STA 402 is clear and the STA 402 can accept a downlink (DL) transmission. The type may be another type of query of the STAs 402. In some embodiments the type 428 may be indicated by the type of frame, which may be availability TF 424.

The mapping 430 may include an indication of an RBID 212 for one or more of the STAs 402. For example, the mapping 430 may be a mapping from association identification (AIDs) of the STAs 402 to RBIDs 212. In some embodiments the mapping 430 is not included in the availability TF 424. In some embodiments the mapping 430 is transmitted in a different frame before the availability TF 424.

The availability TF 424 may include a duration of the TXOP 412. The method 400 continues at operation 454 with STAs 402 transmitting responses 418. For example, STA 1 402.1 transmits response 418.1 with energy on the resource allocation indicated by RBID 212.9. The CCA may be set on the STA 1 402.1 such that it can transmit. STA 2 402.2 may transmit response 418.2 with energy on the resource allocation indicated by RBID 212.24. The energy on the resource allocation may indicate availability and need for an UL resource allocation during the TXOP 412. The energy on the resource allocation may indicate either a one or a zero. There may be only two values on the resource allocation indicated by the RBID 212. STA 3 402.3 may not transmit a response 418.3 to indicate that STA 3 402.3 is not available and/or does not need an UL resource allocation. STA 4 402.4 may not transmit a response 418.4 to indicate that STA 3 402.3 is not available and/or does not need an UL resource allocation.

The responses 418 are transmitted simultaneously by the STA 402 and received by the master station 102 in a response 419. The response 419 includes energy on each resource allocation that was transmitted by the STAs 402 (e.g., as illustrated on the resource allocations indicated by RBID 212.9 and 212.24).

Phase 1 408 may include operations 451, 452, and 454. The method 400 continues at operation 456 with the master station 102 transmitting a UL MU TF. The UL MU TF 426 includes a resource allocation 432 that indicates a resource for STA 1 402.1 and STA 2 402.2. The master station 102 may determine the resource allocation 432 based at least on the response 419.

The method 400 continues at operation 458 with STA 1 402.1 and STA 2 402.2 transmitting UL frames 412 in accordance with the resource allocation 432. The method 400 may continue at operation 460 with the master station 102 transmitting acknowledgements (ACKs) to STA 1 402.1 and STA 2 402.2. Phase 2 410 may include operations 456, 458, and 460. The method 400 may end after operation 460 or may include one or more additional operations.

Figure 5:
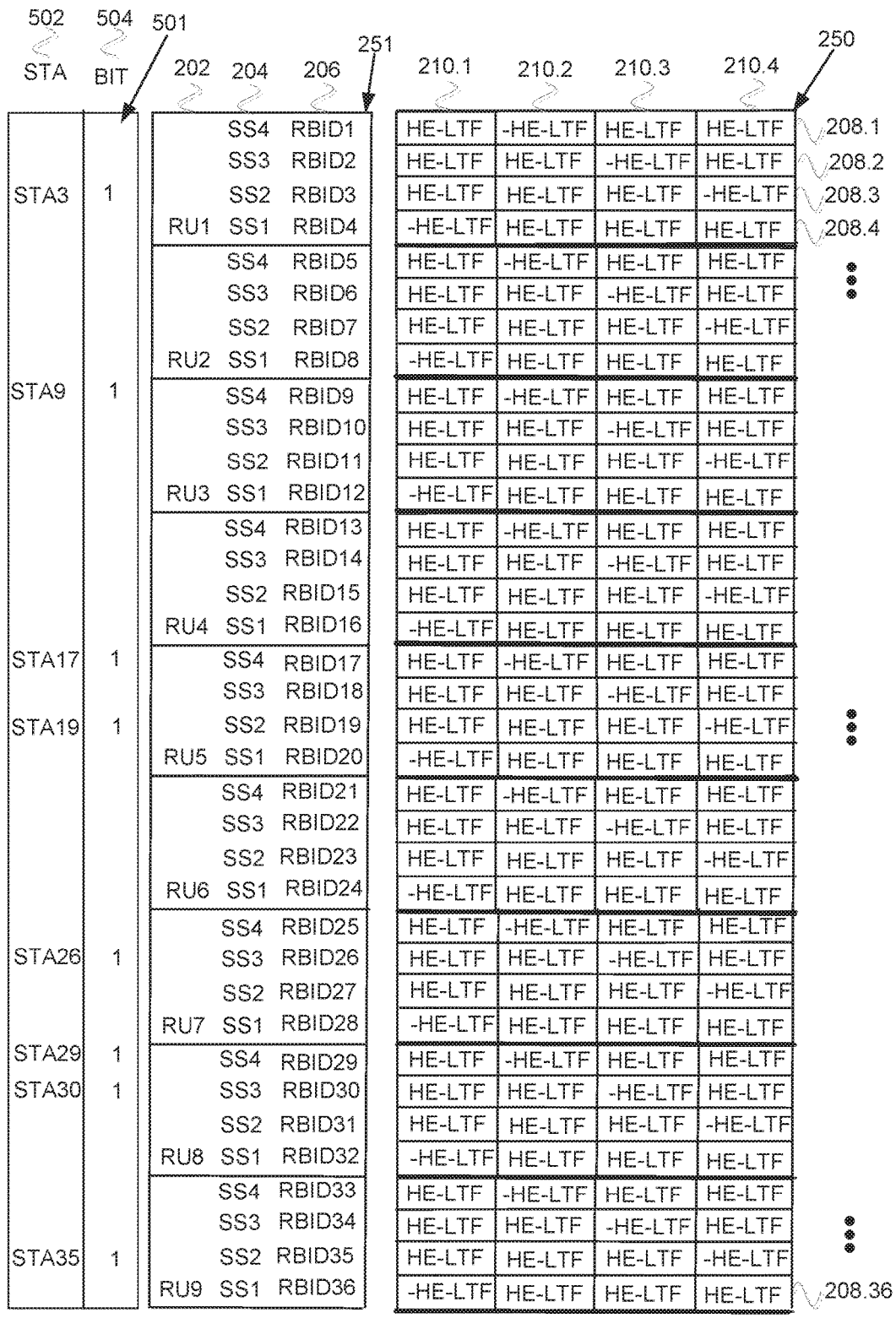
FIG. 5 illustrates responses to an availability trigger frame in accordance with some embodiments.

FIG. 5 illustrates responses 501 to an availability trigger frame in accordance with some embodiments. The responses 501 include STAs 502 and bits 504. The responses 501 include STA3 transmitting 1 bit on the resource allocation indicated by RBID3, STA9 transmitting 1 bit on the resource allocation indicated by RBID9, STA17 transmitting 1 bit on the resource allocation indicated by RBID17, etc. The RBIDs may have been transmitted to the STAs 502 by a mapping 428 from the master station 102. STAs 502 not illustrated may have determined not to transmit energy on the resource allocation indicated by the RBIDs.

Figure 6:
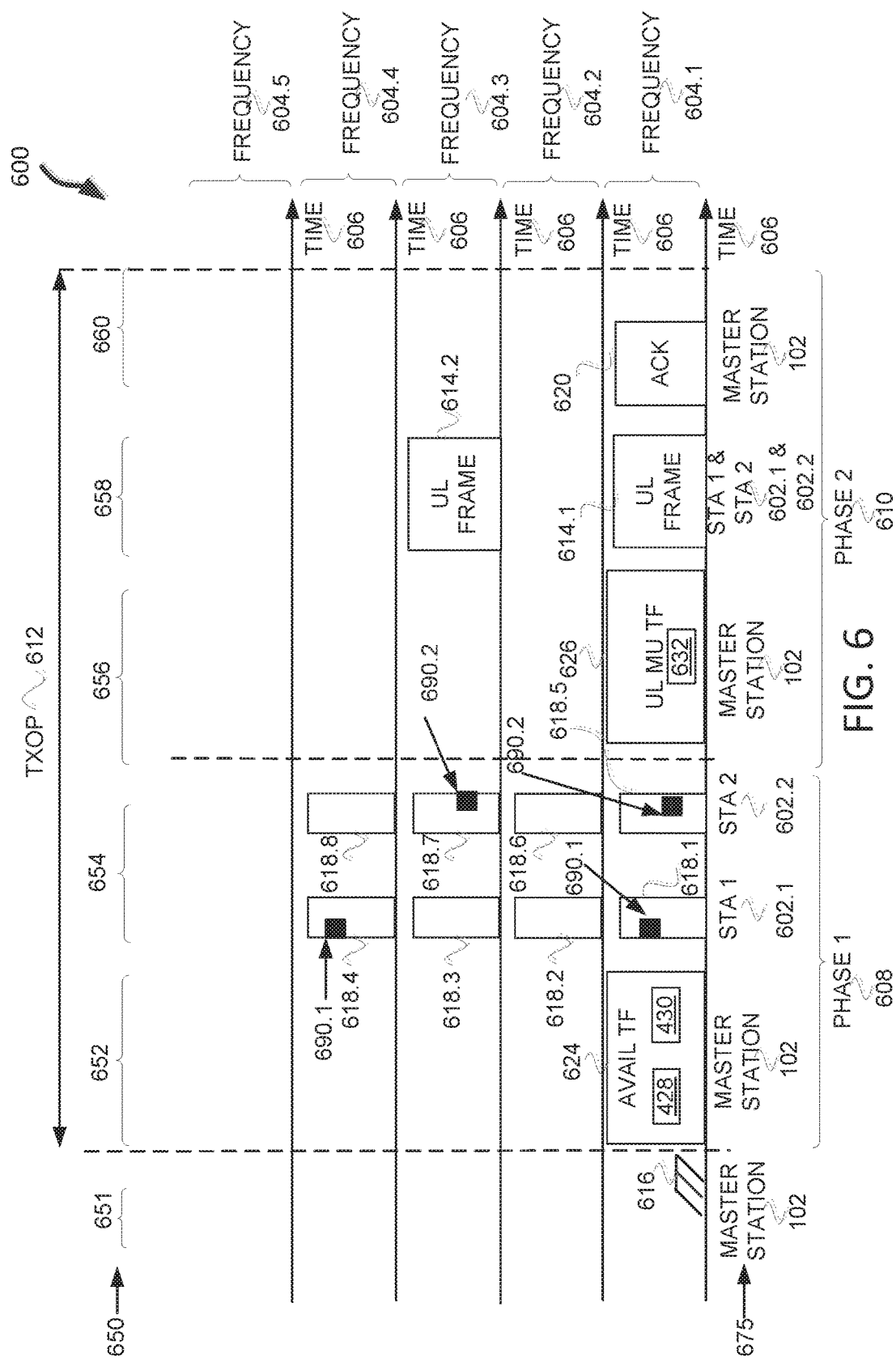
FIG. 6 illustrates a method of MU feedback in accordance with some embodiments.

FIG. 6 illustrates a method 600 of MU feedback in accordance with some embodiments. Illustrated in FIG. 6 is time 606 along the horizontal axis, transmitter 675 along the horizontal axis, frequency 604 along the vertical axis, and a transmission opportunity (TXOP) 612.

As illustrated, each of the frequencies 604.1, 604.2, 604.3, and 604.4 are different 20 MHz channel. Frequency 604.1 may be a primary channel. In some embodiments, the frequencies 604 may be RUs 202 (see FIG. 2) with a bandwidth size of approximately 2 MHz. In some embodiments, there may be more or fewer frequencies 604. For example, there may be 8 or 16 frequencies 604 for 160 MHz or 320 MHz, respectively. As another example, if the frequencies 604 are RUs 202 there may be nine frequencies 604 to correspond to one frequency 604 for each RU 202.

The TXOP 612 may include a phase 1 608 and a phase 2 610. Operation 650 are illustrated along the top. STAs 602 may be HE stations 104. Only two STAs 602 are illustrated; however, in some embodiments there may be one STA 602 or more than two STAs 602. Each STA 602 may have different RBID assignments.

The method 600 may begin at operation 651 with the master station 102 acquiring the wireless medium 616. The method 400 continues at operation 652 with the master station 102 transmitting an availability trigger frame (TF) 624. The availability TF 624 may include a type 628 and an RBID mapping 630. The type 628 may be the same or similar as the type 428 (see FIG. 4). As illustrated, in FIG. 6, the type may be an indication that the STA 602 should transmit an indication on each channel whether the STA 602 is available on that station and/or whether the STA 602 wants to receive an UL resource allocation from the master station 102. In some embodiments, the type 628 may be whether the each STA 602 is available for a DL resource allocation or transmission. The STA 602 may determine its availability based on a clear channel assessment (CCA). The mapping 630 may be the same or similar as the mapping 430 (see FIG. 4).

The available TF 624 may include a duration that indicates a duration of the TXOP 612. The method 600 may continue with STA 602 transmitting response 618 that indicate if STAs 602 would like an UL resource allocation on the corresponding frequency 604.1. As illustrated, STA 1 602.1 is transmitting energy on the resource allocation indicated by RBID 690.1 on both frequency 604.4 and frequency 604.1. As illustrated, STA 2 602.2 is transmitting energy on the resource allocation indicated by RBID 690.2 on both frequency 604.3 and frequency 604.1.

STA 1 602.1 and STA 2 602.2 are transmitting simultaneously, although the illustration has the responses 618 side by side. Phase 1 may include operation 652 and 654.

The method 600 continues at operation 656 with the master station 102 transmitting UL MU TF 632. The UL MU TF 632 may include a resource allocation 632 that may include a resource allocation in frequency 604.1 for STA 1 602.1 and a resource allocation in frequency 604.3 for STA 2 602.2. The master station 102 may determine the resource allocation 632 based on the responses 618.

The method 600 continues at operation 658 with STA 1 602.1 transmitting UL frame 614.1 in frequency 604.1 and STA 2 602.2 transmitting UL frame 614.2 in frequency 604.3. The STAs 602 transmit the UL frames in accordance with the resource allocation 632.

The method 600 continues at operation 660 with the master station 102 transmitting ACK 620 to acknowledge receipt of UL frames 614.1 and 614.2. In some embodiments the master station 102 may transmit ACKs in the frequency 604 that the master station 102 received the UL frame 614. Phase 2 may include operations 656, 658, and 660. The method 600 may end after operation 660 or may include one or more operations which may be part of the TXOP 612.

Figure 7:
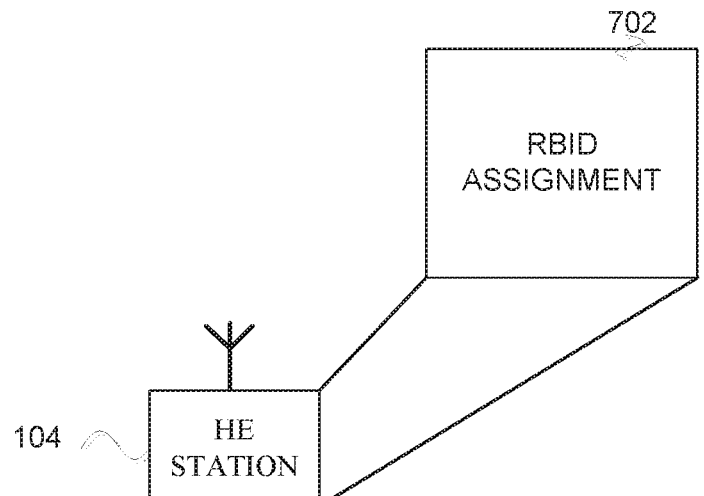
FIG. 7 illustrates an RBID assignment in accordance with some embodiments.

FIG. 7 illustrates an RBID assignment in accordance with some embodiments. Illustrated in FIG. 7 is an RBID assignment 702 and an HE station 104. The RBID assignment 702 may include one or more RBIDs the HE station 104 is to use to respond to the master station 102.

Figure 8:
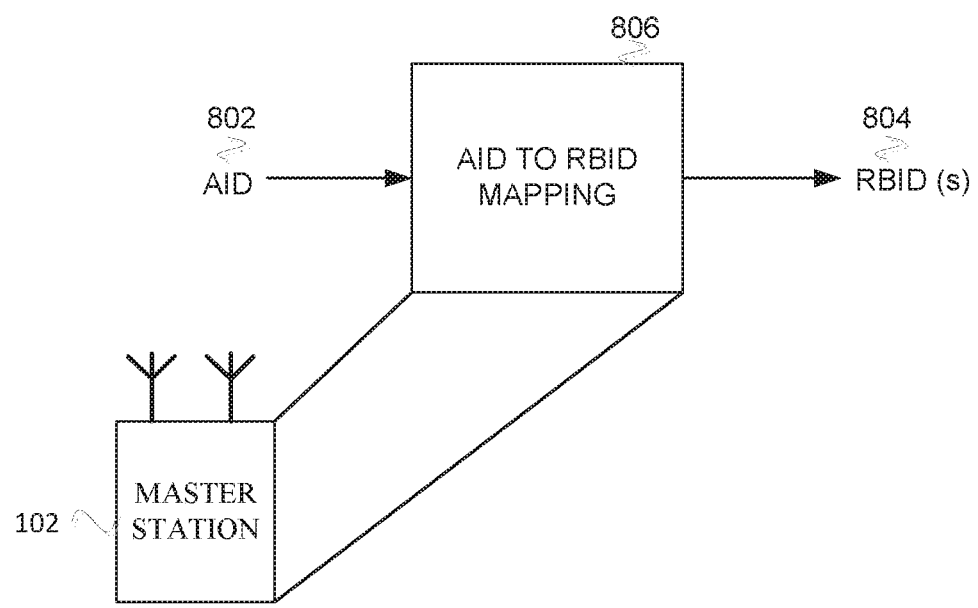
FIG. 8 illustrates an AID to RBID mapping in accordance with some embodiments.

FIG. 8 illustrates an AID to RBID mapping 806 in accordance with some embodiments. Illustrated in FIG. 8 is a master station 102 and AID to RBID mapping. The AID to RBID mapping takes an AID 802 and maps it to one or more RBIDs. The master station 102 may store the AID to RBID mapping and may determine the AID to RBID mapping.

Figure 9:
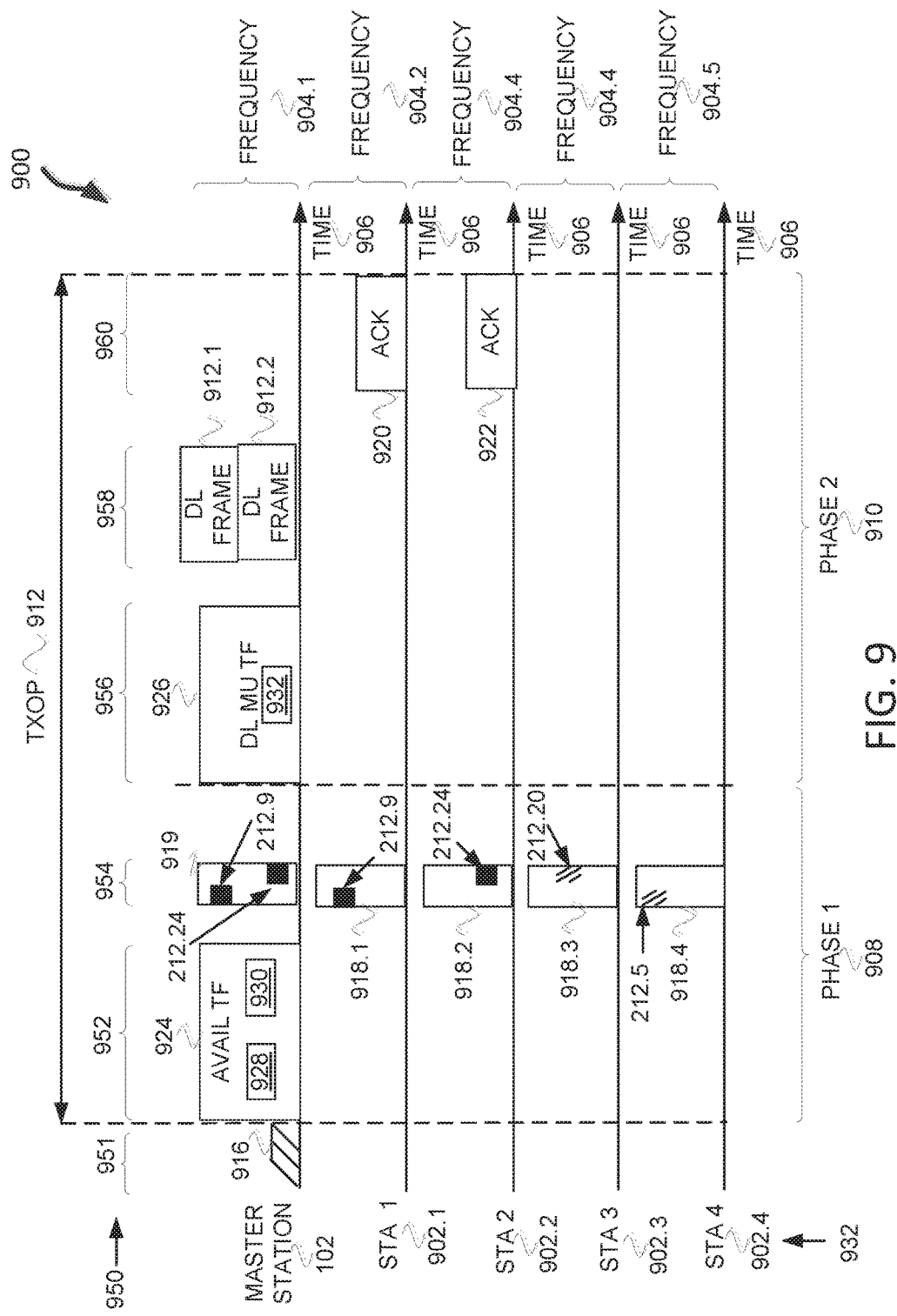
FIG. 9 illustrates a method of MU feedback using HE-LTF in accordance with some embodiments.

FIG. 9 illustrates a method 900 of MU feedback using HE-LTF in accordance with some embodiments. Illustrated in FIG. 9 is time 906 along a horizontal axis, transmitter or receiver 932 along a vertical axis, frequency 904 along the vertical axis, and a transmission opportunity (TXOP) 912. As illustrated, each of the frequencies 904.1, 904.2, 904.3, and 904.4 are the same 20 MHz channel, which may be a primary channel. The frequencies 904 may be different channels and different bandwidths. The TXOP 912 may include a phase 1 908 and a phase 2 910. Operations 950 are illustrated along the top. STAs 902 may be HE stations 104.

The method 900 begins at operation 951 with the master station 102 acquiring the wireless medium 916. The method 900 continues at operation 952 with the master station 102 transmitting an availability trigger frame (TF). The availability TF 924 may include a type 928 and an RBID mapping 930. The type 928 may indicate a type of query the availability TF 924. For example, as illustrated in FIG. 9, the type may be query as to whether the STAs 902 are available and/or want to receive an DL resource allocation from the master station 102. The type may be an indication that the STA 902 should transmit an indication on each channel whether the STA 902 is available on that station and/or whether the STA 902 wants to receive (or can receive) an DL resource allocation from the master station 102.

The STA 902 may determine their availability based on a clear channel assessment (CCA). The type 928 may be another type such as an indication that the STAs 902 should transmit on each RU 202 (see FIG. 2). The type 928 may be another type which may include different duration indications and single user allocations. The type 928 may be another type of query of the STAs 902. In some embodiments the type 928 may be indicated by the type of frame, which may be availability TF 924.

The mapping 930 may include an indication of an RBID 212 for one or more of the STAs 902. For example, the mapping 930 may be a mapping from association identification (AIDs) of the STAs 902 to RBIDs 212. In some embodiments the mapping 930 is not included in the availability TF 924. In some embodiments the mapping 930 is transmitted in a different frame before the availability TF 924.

The availability TF 924 may include a duration of the TXOP 912. The method 900 continues at operation 954 with STAs 902 transmitting responses 918. For example, STA 1 902.1 transmits response 918.1 with energy on the resource allocation indicated by RBID 212.9. The CCA may be set on the STA 1 902.1 such that it can transmit. STA 2 902.2 may transmit response 918.2 with energy on the resource allocation indicated by RBID 212.24. The energy on the resource allocation may indicate availability for a DL resource allocation during the TXOP 912. The energy on the resource allocation may indicate either a one or a zero. There may be only two values on the resource allocation indicated by the RBID 212. STA 3 902.3 may not transmit a response 918.3 to indicate that STA 3 902.3 is not available and/or does not need an UL resource allocation. STA 4 902.4 may not transmit a response 918.4 to indicate that STA 3 902.3 is not available.

The responses 918 are transmitted simultaneously by the STA 902 and received by the master station 102 in a response 919. The response 919 includes energy on each resource allocation that was transmitted by the STAs 902 (e.g., as illustrated on the resource allocations indicated by RBID 212.9 and 212.24).

Phase 1 908 may include operations 951, 952, and 954. The method 900 continues at operation 956 with the master station 102 transmitting a DL MU TF 926. The DL MU TF 926 includes a resource allocation 932 that indicates a DL resource allocation for STA 1 902.1 and STA 2 902.2. The DL resource allocations may be a portion of or the entire operating bandwidth of the master station 102. The master station 102 may determine the DL resource allocation 932 based at least on the response 919.

The method 900 continues at operation 958 with master station 102 transmitting DL frames 912 in accordance with the resource allocation 932. The DL frame 912.1 may be transmitted to STA 1 902.1, and DL frame 912.2 may be transmitted to STA 2 902.2. The method 900 may continue at operation 960 with the STA 1 902.1 and STA 2 902.2 transmitting acknowledgements (ACKs) 920 to the master station 102. Phase 2 910 may include operations 956, 958, and 960. The method 900 may end after operation 960 or may include one or more additional operations.

Figure 10:
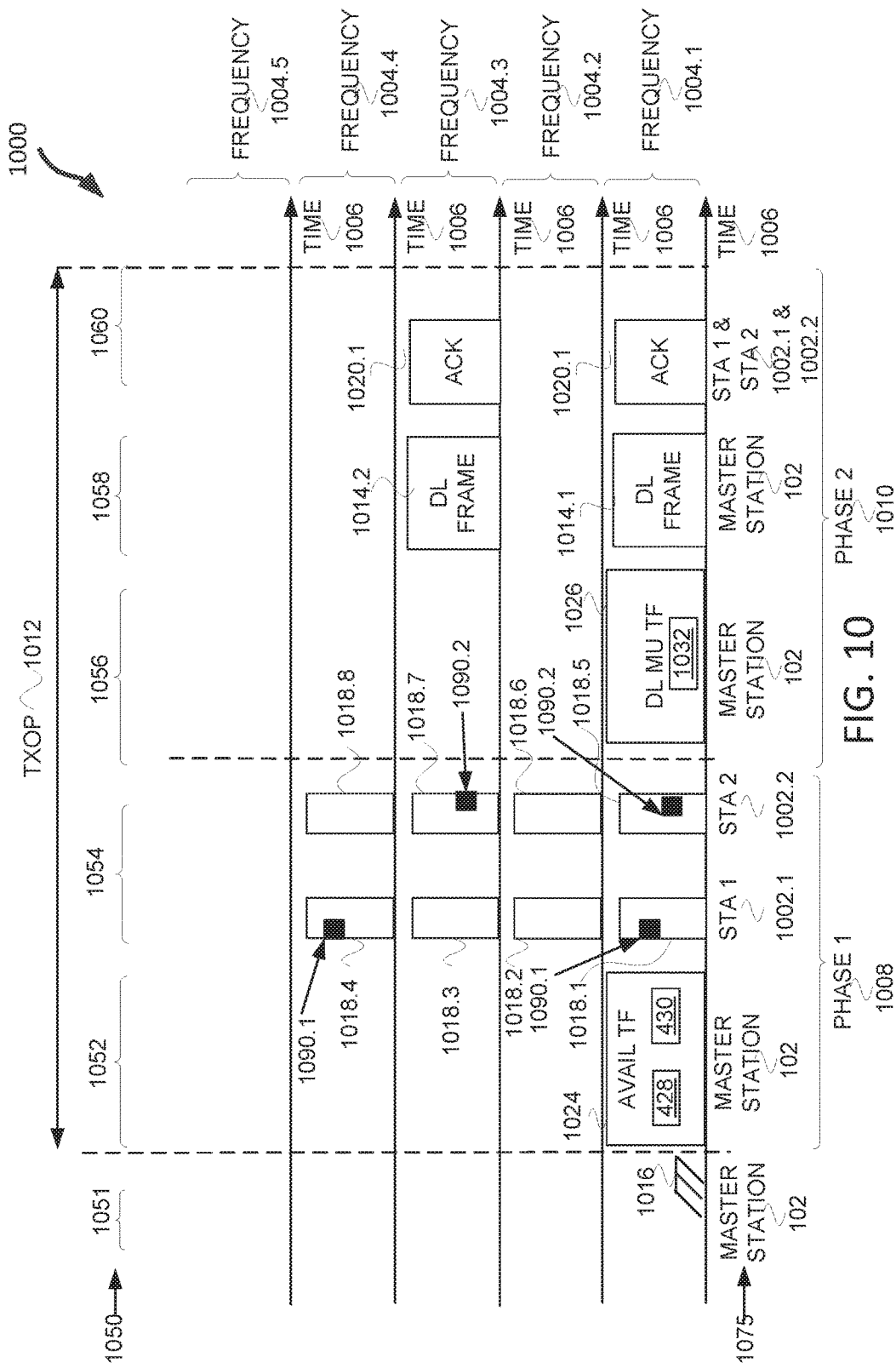
FIG. 10 illustrates a method of MU feedback in accordance with some embodiments.

FIG. 10 illustrates a method 1000 of MU feedback in accordance with some embodiments. Illustrated in FIG. 10 is time 1006 along the horizontal axis, transmitter 1075 along the horizontal axis, frequency 1004 along the vertical axis, and a transmission opportunity (TXOP) 1012.

As illustrated, each of the frequencies 1004.1, 1004.2, 1004.3, and 1004.4 are different 20 MHz channel. Frequency 1004.1 may be a primary channel. In some embodiments, the frequencies 1004 may be RUs 202 (see FIG. 2) with a bandwidth size of approximately 2 MHz. In some embodiments, there may be more or fewer frequencies 1004. For example, there may be 8 or 16 frequencies 1004 for 160 MHz or 320 MHz, respectively. As another example, if the frequencies 1004 are RUs 202 there may be nine frequencies 1004 to correspond to one frequency 1004 for each RU 202.

The TXOP 1012 may include a phase 1 1008 and a phase 2 1010. Operations 1050 are illustrated along the top. STAs 1002 may be HE stations 104. Only two STAs 1002 are illustrated; however, in some embodiments there may be one STA 1002 or more than two STAs 1002. Each STA 1002 may have different RBID assignments.

The method 1000 may begin at operation 1051 with the master station 102 acquiring the wireless medium 1016. The method 1000 continues at operation 1052 with the master station 102 transmitting an availability trigger frame (TF) 1024. The availability TF 1024 may include a type 1028 and an RBID mapping 1030. The type 1028 may be the same or similar as the type 428 (see FIG. 4). As illustrated, in FIG. 10, the type may be an indication that the STA 1002 should transmit an indication on each channel whether the STA 1002 is available on that station for a DL resource allocation or transmission from the master station 102. The STA 1002 may determine its availability based on a clear channel assessment (CCA). The mapping 1030 may be the same or similar as the mapping 430 (see FIG. 4).

The available TF 1024 may include a duration that indicates a duration of the TXOP 1012. The method 1000 may continue with STA 1002 transmitting response 1018 that indicate if STAs 1002 would like an UL resource allocation on the corresponding frequency 1004.1. As illustrated, STA 1 1002.1 is transmitting energy on the resource allocation indicated by RBID 1090.1 on both frequency 1004.4 and frequency 1004.1. As illustrated, STA 2 1002.2 is transmitting energy on the resource allocation indicated by RBID 1090.2 on both frequency 1004.3 and frequency 1004.1.

STA 1 1002.1 and STA 2 1002.2 are transmitting simultaneously, although the illustration has the responses 1018 side by side. Phase 1 may include operation 1052 and 1054.

The method 1000 continues at operation 1056 with the master station 102 transmitting DL MU TF 1032. The DL MU TF 1032 may include a resource allocation 1032 that may include an indication of a resource allocation in frequency 1004.1 for STA 1 602.1 and a resource allocation in frequency 1004.3 for STA 2 602.2. The master station 102 may determine the resource allocation 1032 based on the responses 1018.

The method 1000 continues at operation 1058 with master station 102 transmitting DL frame 1014.1 in frequency 1004.1 to STA 1 1002.1 and DL frame 1014.2 to STA 2 1002.2 in frequency 1004.3. The master station 102 transmits the DL frames 1014 in accordance with the resource allocation 1032.

The method 1000 continues at operation 1060 with STA 1 1002.1 transmitting ACK 1020.1 and STA 2 1002.2 transmitting ACK 1002.2 to the master station 102. In some embodiments, the resource allocation to transmit the ACK 1002 is included in resource allocation 1032. Phase 2 may include operations 1056, 1058, and 1060. The method 1000 may end after operation 1060 or may include one or more operations which may be part of the TXOP 1012.

Figure 11:
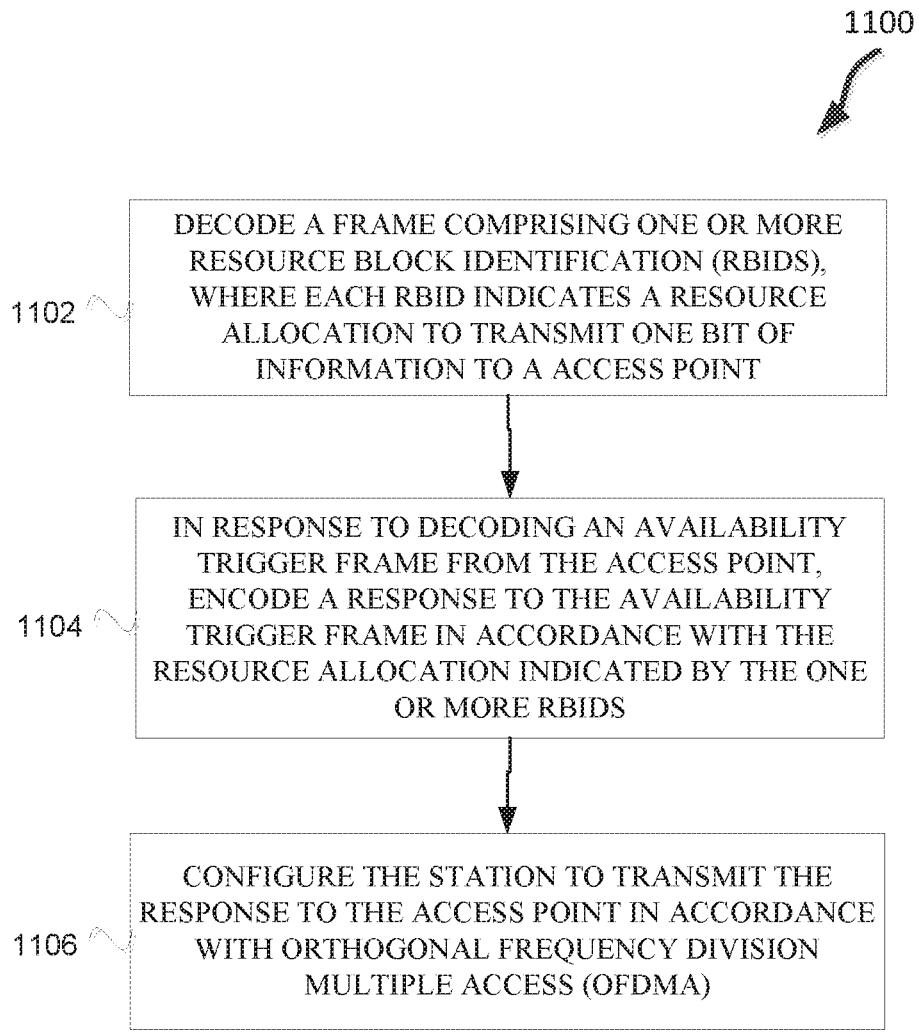
FIG. 11 illustrates a method of MU feedback in accordance with some embodiments.

FIG. 11 illustrates a method 1100 of MU feedback in accordance with some embodiments. The method 110 may begin at operation 1102 with decoding a frame comprising one or more resource block identification (RBIDs), where each RBID indicates a resource allocation to transmit one bit of information to a access point. For example, STAs 402, 602, 902, 1002 may decode availability TF 424, 624, 924, 1024, as described in conjunction with FIGS. 4, 6, 9, and 10, respectively.

The method 1110 may continue at operation 1104 with in response to decoding an availability trigger frame from the access point, encoding a response to the availability trigger frame in accordance with the resource allocation indicated by the one or more RBIDs. For example, STAs 402, 602, 902, 1002 may encode responses 418, 618, 918, 1018, as described in conjunction with FIGS. 4, 6, 9, and 10, respectively. The method 1110 may include a step of determining the response as disclosed in conjunction with FIGS. 1-13.

The method 1110 may continue at operation 1106 with configuring the station to transmit the response to the access point in accordance with orthogonal frequency division multiple access (OFDMA). For example, STAs 402, 602, 902, 1002 may be configured to transmit responses 418, 618, 918, 1018, as described in conjunction with FIGS. 4, 6, 9, and 10, respectively. The method 1110 may continue with one or more additional steps as disclosed in conjunction with FIGS. 4, 6, 9, and 10.

Figure 12:
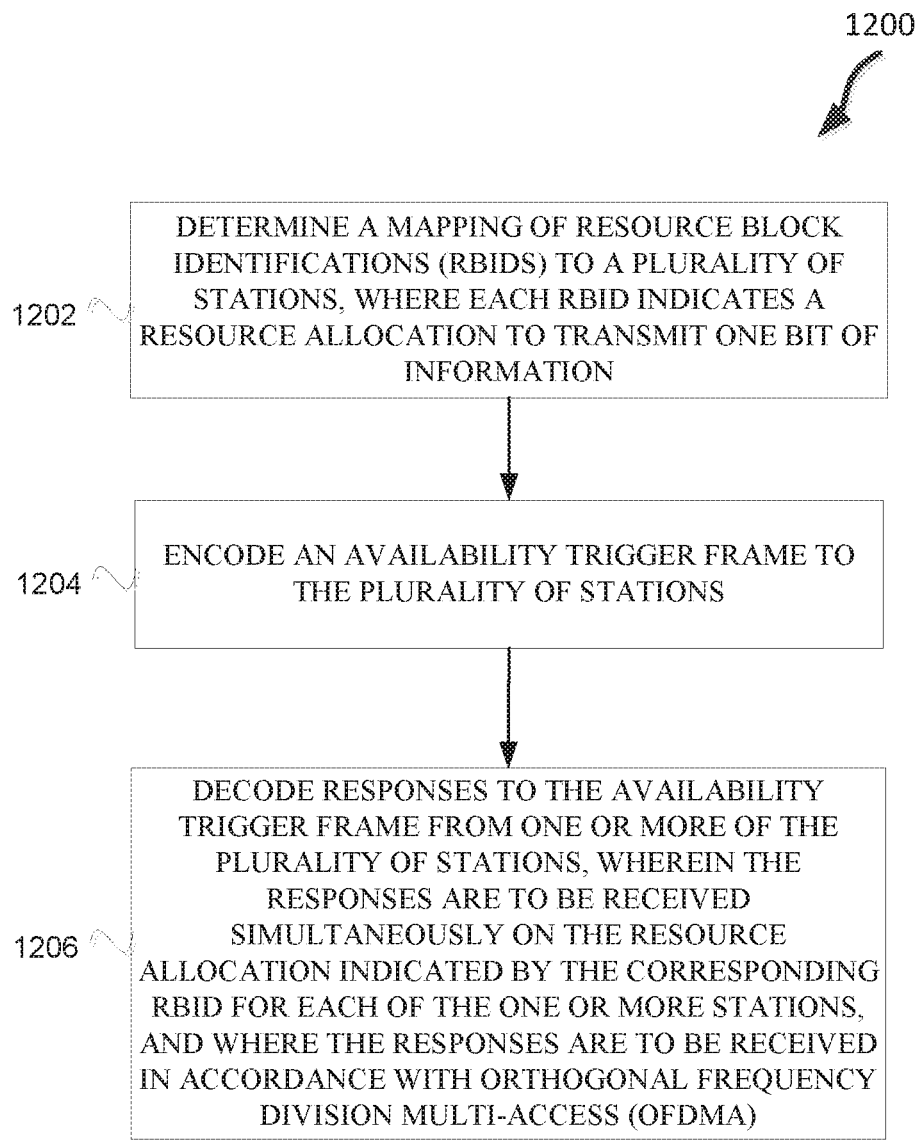
FIG. 12 illustrates a method of MU feedback in accordance with some embodiments.

FIG. 12 illustrates a method 1200 of MU feedback in accordance with some embodiments. The method 1200 may begin at operation 1202 with determining a mapping of resource block identifications (RBIDs) to a plurality of stations, where each RBID indicates a resource allocation to transmit one bit of information. For example, the master station 102 may determine RBID mapping 430 and 928 as disclosed in conjunction with FIGS. 4, 6, 9, and 10.

The method 1200 may continue at operation 1204 with encoding an availability trigger frame to the plurality of stations. For example, master station 102 or an apparatus of the master station 102 may encode availability TF 424, 624, 924, 1024, as described in conjunction with FIGS. 4, 6, 9, and 10, respectively.

Figure 13:
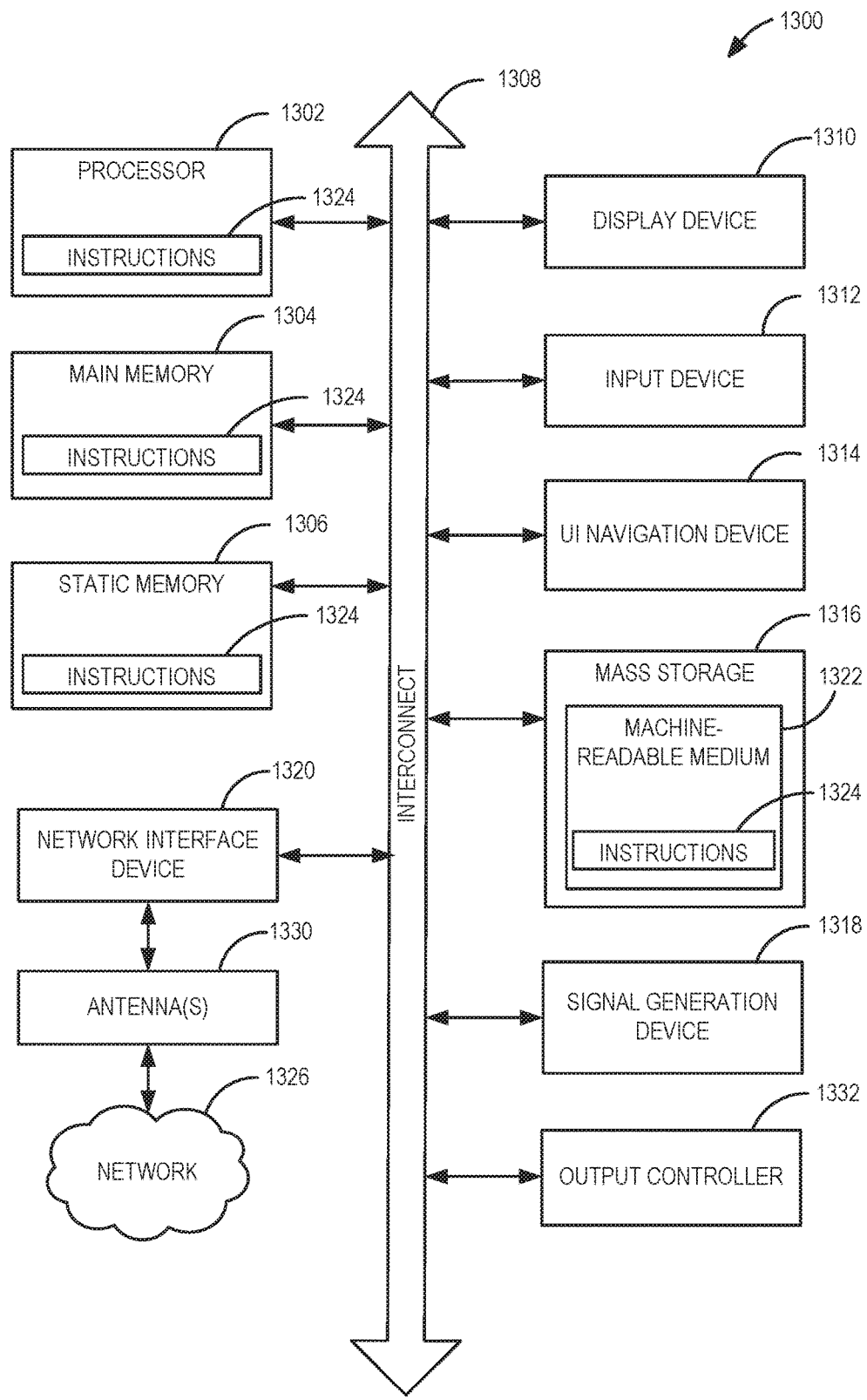
FIG. 13 illustrates a HEW device in accordance with some embodiments.

The method 1200 may continue at operation 1206 with decoding responses to the availability trigger frame from one or more of the plurality of stations, where the responses are to be received simultaneously on the resource allocation indicated by the corresponding RBID for each of the one or more stations, and wherein the responses are to be received in accordance with orthogonal frequency division multi-access (OFDMA). For example, the master station 102 or apparatus of the master station 102 may decode response 419, 619, 919, and 1019, as described in conjunction with FIGS. 4, 6, 9, and 10, respectively FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a master station 102, HEW station 104, personal computer (PC), a tablet PC, a set-top box (STB), a personal digital assistant (PDA), a mobile telephone, a smart phone, a web appliance, a network router, switch or bridge, an apparatus, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1302 and/or instructions 1324 may comprise processing circuitry.

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. In some examples, the network interface device 1320 may wirelessly communicate using Multiple User MIMO techniques. The term "transmission medium" shall be taken to include any intangible medium that is capable of storing, encoding or carrying instructions for execution by the machine 1300, and includes digital or analog communications signals or other intangible medium to facilitate communication of such software.

The following examples pertain to further embodiments. Specifics in the examples may be used in one or more embodiments. Example 1 is an apparatus of a station comprising memory and processing circuitry couple to the memory, the processing circuitry configured to: decode a frame comprising one or more resource block identification (RBIDs), where each RBID indicates a resource allocation to transmit one bit of information to a access point, in response to decoding an availability trigger frame from the access point, encode a response to the availability trigger frame in accordance with the resource allocation indicated by the one or more RBIDs, and configure the station to transmit the response to the access point in accordance with orthogonal frequency division multiple access (OFDMA).

In Example 2, the subject matter of Example 1 can optionally include where the availability trigger frame is an uplink (UL) resource allocation request query, and wherein the processing circuitry is further configured to: determine whether the station is to request an UL resource allocation, in response to decoding the availability trigger frame from the access point and determining that the station is to request the UL resource allocation, encode the response to the availability trigger frame to transmit energy on the resource allocation indicated by the one or more RBIDs, and decode a packet from the access point, where the packet indicates an UL resource allocation for the station.

In Example 3, the subject matter of Example 3 can optionally include where the processing circuitry is further configured to: determine whether the station is to request the UL resource allocation based on at least one of the following group: a clear channel assessment (CCA) and network allocation vector (NAV).

In Example 4, the subject matter of any of Examples 1-3 can optionally include where the availability trigger frame is an uplink (UL) resource allocation request query, and where the station is allocated an RBID for each of one or more subchannels, where the processing circuitry is further configured to: in response to decoding the availability trigger frame from the access point, determine which of the one or more subchannels to request an UL resource allocation; and encode the response to the availability trigger frame with each subchannel determined to request the UL resource allocation with a value 1 in accordance with the corresponding RBID.

In Example 5, the subject matter of Example 4 can optionally include where the subchannels are each 20 MHz or exactly 26 data subcarriers.

In Example 6, the subject matter of Example 4 can optionally include where the processing circuitry is further configured to: configure the station to transmit the response to the access point in accordance with orthogonal frequency division multiple access (OFDMA).

In Example 7, the subject matter of Example 4 can optionally include where the processing circuitry is further configured to configure the station to transmit the response to the access point in accordance with OFDMA and multi-user multiply-input multiply-output (MU-MIMO).

In Example 8, the subject matter of any of Examples 1-7 can optionally include where each resource allocation indicates a frequency resource allocation and a spatial stream allocation.

In Example 9, the subject matter of Example 8 can optionally include where each resource allocation indicated by the one or more RBIDs is one of thirty-six resource blocks per 20 MHz subchannel with nine frequency resource blocks in a frequency domain by four spatial streams in a spatial domain.

In Example 10, the subject matter of Example 9 can optionally include where each of the nine frequency resource blocks in the frequency domain is exactly 26 data tones or exactly 52 data tones.

In Example 11, the subject matter of any of Examples 1-10 can optionally include where the availability trigger frame is an (DL) resource allocation request query, and where the processing circuitry is further configured to: determine whether the station is available for a DL resource allocation, in response to decoding the availability trigger frame from the access point and determining that the station is available for the DL resource allocation, encode the response to the availability trigger frame to transmit energy on the resource allocation indicated by the one or more RBIDs, and decode a packet from the access point, where the packet indicates a DL resource allocation for the station.

In Example 12, the subject matter of Example 11 can optionally include where the processing circuitry is further configured to determine whether the station is available for the DL resource allocation based on at least one of the following group: a clear channel assessment (CCA) and a network allocation vector (NAV).

In Example 13, the subject matter of any of Examples 1-12 can optionally include where the response is a high-efficiency long training field (HE-LTF).

In Example 14, the subject matter of any of Examples 1-13 can optionally include where the frame is the availability trigger.

In Example 15, the subject matter of any of Examples 1-14 can optionally include where the station and the access point are each one from the following group: a master station, an Institute of Electrical and Electronic Engineers (IEEE) 802.11ax access point, and an IEEE 802.11ax station.

In Example 16, the subject matter of any of Examples 1-15 can optionally include further comprising one or more antennas coupled to the processing circuitry.

In Example 17, the subject matter of Examples 16 can optionally include transceiver circuitry couple to the one or more antennas.

Example 18 is a non-transitory computer-readable storage medium that stores instructions for execution by one or more processors. The instructions to configure the one or more processors to cause a station to: decode a frame comprising one or more resource block identification (RBIDs), where each RBID indicates a resource allocation to transmit one bit of information to a access point, in response to decoding an availability trigger frame from the access point, encode a response to the availability trigger frame in accordance with the resource allocation indicated by the one or more RBIDs, and configure the station to transmit the response to the access point in accordance with orthogonal frequency division multiple access (OFDMA).

In Example 19, the subject matter of Examples 19 can optionally include where the availability trigger frame is an uplink (UL) resource allocation request query, and where the instructions further configure the one or more processor to cause the station to: determine whether the station is to request an UL resource allocation, in response to decoding the availability trigger frame from the access point and determining that the station is to request the UL resource allocation, encode the response to the availability trigger frame to transmit energy on the resource allocation indicated by the one or more RBIDs, and decode a packet from the access point, where the packet indicates an UL resource allocation for the station.

Example 20 is a method performed by a station, the method including: decoding a frame comprising one or more resource block identification (RBIDs), where each RBID indicates a resource allocation to transmit one bit of information to a access point, in response to decoding an availability trigger frame from the access point, encoding a response to the availability trigger frame in accordance with the resource allocation indicated by the one or more RBIDs, and configuring the station to transmit the response to the access point in accordance with orthogonal frequency division multiple access (OFDMA).

In Example 21, the subject matter of Example 20 can optionally include where the availability trigger frame is an uplink (UL) resource allocation request query, and the method further including: determining whether the station is to request an UL resource allocation, in response to decoding the availability trigger frame from the access point and determining that the station is to request the UL resource allocation, encoding the response to the availability trigger frame to transmit energy on the resource allocation indicated by the one or more RBIDs, and decoding a packet from the access point, where the packet indicates an UL resource allocation for the station.

Example 22 is an apparatus of an access point comprising transceiver circuitry and processing circuitry configured to: determine a mapping of resource block identifications (RBIDs) to a plurality of stations, wherein each RBID indicates a resource allocation to transmit one bit of information, encode an availability trigger frame to the plurality of stations, and decode responses to the availability trigger frame from one or more of the plurality of stations, where the responses are to be received simultaneously on the resource allocation indicated by the corresponding RBID for each of the one or more stations, and where the responses are to be received in accordance with orthogonal frequency division multi-access (OFDMA).

In Example 23, the subject matter of Example 22 can optionally include where each resource allocation indicates a frequency resource allocation and a spatial stream resource allocation, and where the responses are to be received simultaneously in accordance with OFDMA and multi-user multiply-input multiply-output (MU-MIMO).

In Example 24, the subject matter of Example 23 can optionally include where each frequency resource allocation and spatial stream resource allocation indicated by the one or more RBIDs are part of a high-efficiency long-training field (HE-LTF), and wherein the responses indicate either an availability for downlink (DL) transmission or uplink (UL) transmission.

In Example 25, the subject matter of any of Examples 22-24 can optionally include further comprising one or more antennas coupled to the processing circuitry.

Example 26 is an apparatus of a station. The apparatus comprising: means for decoding a frame comprising one or more resource block identification (RBIDs), wherein each RBID indicates a resource allocation to transmit one bit of information to a access point, in response to decoding an availability trigger frame from the access point, means for encoding a response to the availability trigger frame in accordance with the resource allocation indicated by the one or more RBIDs, and means for configuring the station to transmit the response to the access point in accordance with orthogonal frequency division multiple access (OFDMA).

In Example 27, the subject matter of Example 26 can optionally include where the availability trigger frame is an uplink (UL) resource allocation request query, and further comprising means for determining whether the station is to request an UL resource allocation, in response to decoding the availability trigger frame from the access point and determining that the station is to request the UL resource allocation, means for encoding the response to the availability trigger frame to transmit energy on the resource allocation indicated by the one or more RBIDs, and means for decoding a packet from the access point, where the packet indicates an UL resource allocation for the station.

In Example 28, the subject matter of Example 26 can optionally include means for determining whether the station is to request the UL resource allocation based on at least one of the following group: a clear channel assessment (CCA) and network allocation vector (NAV).

In Example 29, the subject matter of any of Examples 26-28 can optionally include where the availability trigger frame is an uplink (UL) resource allocation request query, and where the station is allocated an RBID for each of one or more subchannels, and further comprising: in response to decoding the availability trigger frame from the access point, means for determining which of the one or more subchannels to request an UL resource allocation, and means for encoding the response to the availability trigger frame with each subchannel determined to request the UL resource allocation with a value 1 in accordance with the corresponding RBID.

In Example 30, the subject matter of Example 29 can optionally include where the subchannels are each 20 MHz or exactly 26 data subcarriers.

In Example 31, the subject matter of Example 29 can optionally include means for configuring the station to transmit the response to the access point in accordance with orthogonal frequency division multiple access (OFDMA).

In Example 32, the subject matter of Example 29 can optionally include means for configuring the station to transmit the response to the access point in accordance with OFDMA and multi-user multiply-input multiply-output (MU-MIMO).

In Example 33, the subject matter of any of Examples 26-32 can optionally include where each resource allocation indicates a frequency resource allocation and a spatial stream allocation.

In Example 34, the subject matter of Example 33 can optionally include where each resource allocation indicated by the one or more RBIDs is one of thirty-six resource blocks per 20 MHz subchannel with nine frequency resource blocks in a frequency domain by four spatial streams in a spatial domain.

In Example 35, the subject matter of Example 34 can optionally include where each of the nine frequency resource blocks in the frequency domain is exactly 26 data tones or exactly 52 data tones.

In Example 36, the subject matter of any of Examples 26-35 can optionally include where the availability trigger frame is an (DL) resource allocation request query, and further including: means for determining whether the station is available for a DL resource allocation, in response to decoding the availability trigger frame from the access point and determining that the station is available for the DL resource allocation, means for encoding the response to the availability trigger frame to transmit energy on the resource allocation indicated by the one or more RBIDs, and means for decoding a packet from the access point, wherein the packet indicates a DL resource allocation for the station.

In Example 37, the subject matter of Example 36 can optionally include means for determining whether the station is available for the DL resource allocation based on at least one of the following group: a clear channel assessment (CCA) and a network allocation vector (NAV).

In Example 38, the subject matter of any of Examples 26-37 can optionally include where the response is a high-efficiency long training field (HE-LTF).

In Example 39, the subject matter of any of Examples 26-38 can optionally include where the frame is the availability trigger.

In Example 40, the subject matter of any of Examples 26-39 can optionally include where the station and the access point are each one from the following group: a master station, an Institute of Electrical and Electronic Engineers (IEEE) 802.11ax access point, and an IEEE 802.11ax station.

In Example 41, the subject matter of any of Examples 26-40 can optionally include means for processing signals from one or more antennas.

In Example 42, the subject matter of Example 41 can optionally include means for transmitting and receiving radio signals.

Example 43 is a non-transitory computer-readable storage medium that stores instructions for execution by one or more processors. The instructions to configure the one or more processors to cause an access point to: determine a mapping of resource block identifications (RBIDs) to a plurality of stations, where each RBID indicates a resource allocation to transmit one bit of information, encode an availability trigger frame to the plurality of stations, and decode responses to the availability trigger frame from one or more of the plurality of stations, where the responses are to be received simultaneously on the resource allocation indicated by the corresponding RBID for each of the one or more stations, and where the responses are to be received in accordance with orthogonal frequency division multi-access (OFDMA).

In Example 44, the subject matter of Example 43 can optionally include where each resource allocation indicates a frequency resource allocation and a spatial stream resource allocation, and where the responses are to be received simultaneously in accordance with OFDMA and multi-user multiply-input multiply-output (MU-MIMO).

In Example 45, the subject matter of Example 44 can optionally include where each frequency resource allocation and spatial stream resource allocation indicated by the one or more RBIDs are part of a high-efficiency long-training field (HE-LTF), and where the responses indicate either an availability for downlink (DL) transmission or uplink (UL) transmission.

Example 46 is a method performed by an access point, the method including determining a mapping of resource block identifications (RBIDs) to a plurality of stations, where each RBID indicates a resource allocation to transmit one bit of information, encoding an availability trigger frame to the plurality of stations, and decoding responses to the availability trigger frame from one or more of the plurality of stations, where the responses are to be received simultaneously on the resource allocation indicated by the corresponding RBID for each of the one or more stations, and where the responses are to be received in accordance with orthogonal frequency division multi-access (OFDMA).

In Example 47, the subject matter of Example 46 can optionally include where each resource allocation indicates a frequency resource allocation and a spatial stream resource allocation, and where the responses are to be received simultaneously in accordance with OFDMA and multi-user multiply-input multiply-output (MU-MIMO).

In Example 48, the subject matter of Example 47 can optionally include where each frequency resource allocation and spatial stream resource allocation indicated by the one or more RBIDs are part of a high-efficiency long-training field (HE-LTF), and wherein the responses indicate either an availability for downlink (DL) transmission or uplink (UL) transmission.

Example 49 is an apparatus of an access point, the apparatus including means for determining a mapping of resource block identifications (RBIDs) to a plurality of stations, where each RBID indicates a resource allocation to transmit one bit of information, means for encoding an availability trigger frame to the plurality of stations, and means for decoding responses to the availability trigger frame from one or more of the plurality of stations, where the responses are to be received simultaneously on the resource allocation indicated by the corresponding RBID for each of the one or more stations, and where the responses are to be received in accordance with orthogonal frequency division multi-access (OFDMA).

In Example 50, the subject matter of Example 49 can optionally include where each resource allocation indicates a frequency resource allocation and a spatial stream resource allocation, and wherein the responses are to be received simultaneously in accordance with OFDMA and multi-user multiply-input multiply-output (MU-MIMO).

In Example 51, the subject matter of Example 50 can optionally include where each frequency resource allocation and spatial stream resource allocation indicated by the one or more RBIDs are part of a high-efficiency long-training field (HE-LTF), and wherein the responses indicate either an availability for downlink (DL) transmission or uplink (UL) transmission.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station comprising memory; and processing circuitry couple to the memory, the processing circuitry configured to:
in response to decoding an availability trigger frame from the access point, the availability trigger frame comprising a feedback type field and a mapping field, determine a resource unit (RU) based on a value of an association identification (AID) of the station and a value of the mapping field, encode a response to the availability trigger frame in accordance with the RU, wherein the RU comprises a plurality of tones of a high-efficiency long training field (HE-LTF); and
configure the station to transmit the response to the access point in accordance with orthogonal frequency division multiple access (OFDMA).

2. The apparatus of claim 1, wherein the availability trigger frame is an uplink (UL) resource allocation request query, and wherein the processing circuitry is further configured to:
determine whether the station is to request an UL resource allocation;
in response to decoding the availability trigger frame from the access point and determining that the station is to request the UL resource allocation, encode the response to the availability trigger frame to transmit energy on the RU; and
decode a packet from the access point, wherein the packet indicates an UL resource allocation for the station.

3. The apparatus of claim 2, wherein the processing circuitry is further configured to:
determine whether the station is to request the UL resource allocation based on at least one of the following group: a clear channel assessment (CCA) and network allocation vector (NAV).

4. The apparatus of claim 1, wherein the availability trigger frame is an uplink (UL) resource allocation request query, and wherein the station is allocated an RU for each of one or more subchannels, wherein the processing circuitry is further configured to:
in response to decoding the availability trigger frame from the access point, determine which of the one or more subchannels to request an UL resource allocation; and
encode the response to the availability trigger frame with each subchannel determined to request the UL resource allocation with a value 1 in accordance with the corresponding RBID.

5. The apparatus of claim 4, wherein the subchannels are each 20 MHz or exactly 26 data subcarriers.

6. The apparatus of claim 4, wherein the processing circuitry is further configured to:
configure the station to transmit the response to the access point in accordance with orthogonal frequency division multiple access (OFDMA).

7. The apparatus of claim 4, wherein the processing circuitry is further configured to configure the station to transmit the response to the access point in accordance with OFDMA and multi-user multiply-input multiply-output (MU-MIMO).

8. The apparatus of claim 1, wherein the RU indicates a frequency resource allocation and a spatial stream allocation.

9. The apparatus of claim 8, wherein each RU is one of thirty-six resource blocks per 20 MHz subchannel with nine frequency resource blocks in a frequency domain by four spatial streams in a spatial domain.

10. The apparatus of claim 9, wherein each of the nine frequency resource blocks in the frequency domain is exactly 26 data tones or exactly 52 data tones.

11. The apparatus of claim 1, wherein the availability trigger frame is an (DL) resource allocation request query, and wherein the processing circuitry is further configured to:
determine whether the station is available for a DL resource allocation;
in response to decoding the availability trigger frame from the access point and determining that the station is available for the DL resource allocation, encode the response to the availability trigger frame to transmit energy on the RU; and
decode a packet from the access point, wherein the packet indicates a DL resource allocation for the station.

12. The apparatus of claim 11, wherein the processing circuitry is further configured to: determine whether the station is available for the DL resource allocation based on at least one of the following group: a clear channel assessment (CCA) and a network allocation vector (NAV).

13. The apparatus of claim 1, wherein the response is a high-efficiency long training field (HE-LTF).

14. The apparatus of claim 1, wherein the station and the access point are each one from the following group: a master station, an Institute of Electrical and Electronic Engineers (IEEE) 802.11ax access point, and an IEEE 802.11ax station.

15. The apparatus of claim 1, further comprising one or more antennas coupled to the processing circuitry.

16. The apparatus of claim 15, further comprising transceiver circuitry couple to the one or more antennas.

17. A non-transitory computer-readable storage medium that stores instructions for execution by one or more processors, the instructions to configure the one or more processors to cause a station to:
in response to decoding an availability trigger frame from the access point, the availability trigger frame comprising a feedback type field and a mapping field, determine a resource unit (RU) based on a value of an association identification (AID) of the station and a value of the mapping field, encode a response to the availability trigger frame in accordance with the RU, wherein the RU comprises a plurality of tones of a high-efficiency long training field (HE-LTF); and
configure the station to transmit the response to the access point in accordance with orthogonal frequency division multiple access (OFDMA).

18. The non-transitory computer-readable storage medium of claim 17, wherein the availability trigger frame is an uplink (UL) resource allocation request query, and wherein the instructions further configure the one or more processor to cause the station to:
determine whether the station is to request an UL resource allocation;
in response to decoding the availability trigger frame from the access point and determining that the station is to request the UL resource allocation, encode the response to the availability trigger frame to transmit energy on the RU; and
decode a packet from the access point, wherein the packet indicates an UL resource allocation for the station.

19. A method performed by a station, the method comprising:

in response to decoding an availability trigger frame from the access point, the availability trigger frame comprising a feedback type field and a mapping field, determine a resource unit (RU) based on a value of an association identification (AID) of the station and a value of the mapping field, encode a response to the availability trigger frame in accordance with the RU, wherein the RU comprises a plurality tones of a high-efficiency long training field (HE-LTF); and configure the station to transmit the response to the access point in accordance with orthogonal frequency division multiple access (OFDMA).

20. The method of claim 19, wherein the availability trigger frame is an uplink (UL) resource allocation request query, and the method further comprising:

determining whether the station is to request an UL resource allocation;

in response to decoding the availability trigger frame from the access point and determining that the station is to request the UL resource allocation, encoding the response to the availability trigger frame to transmit energy on the RU; and decoding a packet from the access point, wherein the packet indicates an UL resource allocation for the station.

21. An apparatus of an access point comprising memory; and processing circuitry coupled to the memory, wherein the processing circuitry is configured to:

encode an availability trigger frame to the plurality of stations the availability trigger frame comprising a feedback type field and a mapping field, wherein the plurality of stations determine resource units (RUs) based on a value of an association identification (AID) of a corresponding station of the plurality of stations and a value of the mapping field, wherein the RUs comprise a plurality of tones of a high-efficiency long training field (HE-LTF); and decode responses to the availability trigger frame from one or more of the plurality of stations, wherein the responses are to be received simultaneously on the RUs, and wherein the responses are to be received in accordance with orthogonal frequency division multi-access (OFDMA).

22. The apparatus of claim 21, wherein each RU of the RUs indicates a frequency resource allocation and a spatial stream resource allocation, and wherein the responses are to be received simultaneously in accordance with OFDMA and multi-user multiply-input multiply-output (MU-MIMO).

23. The apparatus of claim 22, wherein the responses indicate either an availability for downlink (DL) transmission or uplink (UL) transmission.

24. The apparatus of claim 21, further comprising one or more antennas coupled to the processing circuitry.

* * * * *